United States Patent
Allen

(10) Patent No.: US 10,872,518 B2
(45) Date of Patent: *Dec. 22, 2020

(54) ALERTHUB SYSTEM WITH TWO TOUCH BADGE

(71) Applicant: Alertpoint, LLC, Kennesaw, GA (US)

(72) Inventor: David Gordon Allen, Acworth, GA (US)

(73) Assignee: Alertpoint, LLC, Kennesaw, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/751,290

(22) Filed: Jan. 24, 2020

(65) Prior Publication Data

US 2020/0160691 A1  May 21, 2020

Related U.S. Application Data

(63) Continuation-in-part of application No. 16/204,919, filed on Nov. 29, 2018.

(60) Provisional application No. 62/592,149, filed on Nov. 29, 2017.

(51) Int. Cl.
| | |
|---|---|
| *G08B 25/01* | (2006.01) |
| *G08B 25/12* | (2006.01) |
| *H04W 76/50* | (2018.01) |
| *H04W 88/16* | (2009.01) |
| *H04W 4/80* | (2018.01) |
| *H04W 4/90* | (2018.01) |
| *H04W 4/029* | (2018.01) |

(52) U.S. Cl.
CPC ......... *G08B 25/016* (2013.01); *G08B 25/12* (2013.01); *H04W 4/029* (2018.02); *H04W 4/80* (2018.02); *H04W 4/90* (2018.02); *H04W 76/50* (2018.02); *H04W 88/16* (2013.01)

(58) Field of Classification Search
CPC ......... G08B 25/016; G08B 7/06; H04W 4/80; H04W 4/90; H04W 76/50; H01Q 1/2291; H01Q 1/44
See application file for complete search history.

(56) References Cited

U.S. PATENT DOCUMENTS

| | | | |
|---|---|---|---|
| 4,119,815 A | 10/1978 | Frankfort et al. | |
| 9,396,633 B1 * | 7/2016 | Sannala | G08B 13/19619 |
| 10,643,459 B2 | 5/2020 | Allen | |

(Continued)

FOREIGN PATENT DOCUMENTS

WO 2015143077 A1 9/2015

OTHER PUBLICATIONS

International Search Report issued in PCT Application Serial No. PCT/US2018/063120 dated Feb. 1, 2019.

(Continued)

*Primary Examiner* — Mirza F Alam
(74) *Attorney, Agent, or Firm* — Mark H. Whittenberger; Holland & Knight LLP

(57) ABSTRACT

An alert communication device, an alert activation device, and an alert management system are provided. The alert management system may include one or more alert communication devices communicatively coupled to one or more other alert communication devices and configured to provide one or more of a visual alert and an audio alert and one or more alert activation devices communicatively coupled to at least one alert communication device of the one or more alert communication devices.

16 Claims, 13 Drawing Sheets

(56) References Cited

U.S. PATENT DOCUMENTS

| | | | |
|---|---|---|---|
| 2005/0135570 A1* | 6/2005 | Binning | H04L 12/2803 379/45 |
| 2006/0125630 A1 | 6/2006 | Parkulo | |
| 2007/0139190 A1 | 6/2007 | Tanner et al. | |
| 2010/0285771 A1* | 11/2010 | Peabody | H04M 11/04 455/404.2 |
| 2011/0234394 A1* | 9/2011 | Whattam | G08B 27/00 340/539.11 |
| 2012/0036461 A1 | 2/2012 | Parkulo et al. | |
| 2013/0015966 A1* | 1/2013 | Soomro | A61B 5/002 340/502 |
| 2014/0268629 A1 | 9/2014 | Krishnaswarny et al. | |
| 2014/0354427 A1* | 12/2014 | Rapaport | G08B 21/02 340/539.31 |
| 2015/0099458 A1* | 4/2015 | Weisner | G06F 19/3418 455/15 |
| 2015/0230072 A1 | 8/2015 | Saigh et al. | |
| 2016/0029195 A1 | 1/2016 | Leahy et al. | |
| 2016/0171854 A1* | 6/2016 | McGowan | A63B 9/00 340/541 |
| 2016/0240075 A1 | 8/2016 | Eisenman | |
| 2017/0164176 A1 | 6/2017 | Lieu | |
| 2019/0164413 A1 | 5/2019 | Allen | |

OTHER PUBLICATIONS

International Search Report issued in PCT Application Serial No. PCT/US2018/063126 dated Apr. 3, 2019.
Non-Final Office Action issued in related U.S. Appl. No. 16/204,919 dated Aug. 19, 2019.
Non-Final Office Action issued in related U.S. Appl. No. 16/204,691 dated Sep. 24; 2019.
Final Office Action issued in related U.S. Appl. No. 16/204,919 dated Dec. 4, 2019.
Notice of Allowance issued in related U.S. Appl. No. 16/204,891 dated Jan. 16, 2020.
Non-Final Office Action issued in related U.S. Appl. No. 16/204,919 dated Jun. 15, 2020.
Final Office Action issued in related U.S. Appl. No. 16/204,919 dated Aug. 7, 2020.

* cited by examiner

200

400

800

ALERTHUB SYSTEM WITH TWO TOUCH BADGE

RELATED APPLICATION

This application is a continuation-in-part of application Ser. No. 16/204,919, filed on 29 Nov. 2018, the contents of which are incorporated herein by reference in its entirety.

BACKGROUND

In educational environments, providing a safe and secure learning environment is one of the most daunting challenges facing K-12 schools, universities and colleges today. Additionally, personal safety has become one of the most debilitating workplace stress factors for housekeeping staff today in the hospitality industry. Housekeeping staff and other employees who work alone or in vulnerable areas must deal with the potential for personal harm on a daily basis. Further, with incidents of violence on the rise in retail stores and shopping centers, employee safety has never been more critical. In a public-facing environment, anything can happen at any given moment. In business industries, research shows that employees who feel happy and secure in their workplace are more productive employees. Whether it's a corporate office, manufacturing plant, warehouse or a public-facing branch location, employee peace of mind has a direct impact on the bottom line.

In an effort to reduce incidents of violence in educational environments, hospitality industries, retail stores, and in workplaces generally, everyone is encouraged to report suspicious activity and to seek help quickly to resolve potential threats. However, conventional alert management systems are unable to quickly and efficiently report an emergency or provide an alert to others who can help.

SUMMARY OF DISCLOSURE

In one implementation, an alert communication device is provided. The alert communication device may include a first transceiver configured to communicatively couple the alert communication device with one or more other alert communication devices via a first communication path, a second transceiver configured to communicatively couple the alert communication device with the one or more other alert communication devices via a second communication path, a third transceiver configured to communicatively couple the alert communication device with one or more alert activation devices via a third communication path, and one or more of a visual alert system and an audio alert system.

One or more of the following features may be included. The alert communication device may include a camera system. The alert communication device may be configured to receive an alert signal from the one or more alert activation devices and transmit the alert signal to the one or more other alert communication devices via the first communication path. The alert communication device may be configured to indicate at least a portion of an access path between a predefined first location and a location of the first alert activation device in response to receiving the alert signal from the first alert activation device. The alert communication device may be configured to determine that the first communication path is inaccessible and transmit the alert signal to the one or more alert communication devices via the second communication path in response to determining that the first communication path is inaccessible. The alert communication device may be configured to establish a communication channel between two or more client devices via one or more of the first communication path and the second communication path. The visual alert system may include a plurality of electronically-controlled lights configured to provide a plurality of visual alerts. The third transceiver may be a Bluetooth Low Energy® transceiver configured to determine the location of the one or more alert activation devices relative to the alert communication device.

In another implementation, an alert activation device is provided. The alert activation device may include a transceiver configured to communicatively couple the alert activation device to at least one alert communication device and an activation button communicatively coupled to the transceiver. The alert activation device may be configured to transmit an alert signal via the transceiver in response to a user engaging the activation button. A type of alert signal transmitted by the transceiver may be based upon, at least in part, a plurality of alert activation button press configurations.

One or more of the following features may be included. The alert activation device may be a wearable alert activation device. The alert activation device may be configured to be affixed to an identification badge. The transceiver may be configured to transmit a location of the alert activation device when transmitting the alert signal. The transceiver may be a Bluetooth Low Energy® transceiver. The at least one alert communication device may be configured to indicate at least a portion of an access path between a predefined first location and the location of the alert activation device when transmitting the alert signal. The transceiver may be configured to transmit a general alert signal when a first button of the two or more buttons is engaged and is configured to transmit a medical alert signal when a second button of the two or more buttons is engaged. The at least one alert communication device may be configured to indicate at least a portion of an access path between a predefined first location and the location of the alert activation device when transmitting the medical alert signal.

In another implementation, an alert management system is provided. The alert management system may include one or more alert communication devices communicatively coupled to one or more other alert communication devices and configured to provide one or more of a visual alert and an audio alert and one or more alert activation devices communicatively coupled to at least one alert communication device of the one or more alert communication devices. The alert management system may be configured to receive, at the one or more alert communication devices, an alert signal from a first alert activation device of the one or more alert activation devices; and indicate, via the one or more alert communication devices, an access path between a predefined first location and a location of the first alert activation device in response to receiving the alert signal from the first alert activation device.

One or more of the following features may be included. The alert management system may include one or more alert gateways. The one or more alert communication devices may be communicatively coupled to the one or more alert gateways. The one or more alert communication devices may include a plurality of alert communication devices and are configured to communicatively couple the alert communication device with one or more other alert communication devices of the plurality of alert communication devices via a first communication path. The one or more alert communication devices may be configured to communicatively couple the alert communication device with the one or more other alert communication devices of the plurality of alert communication devices via a second communication path. The alert management system may be configured to transmit the alert signal to the one or more other alert communication devices via a first communication path formed between a plurality of alert communication devices. The alert management system may be configured to determine that the first communication path is inaccessible and transmit the alert signal to the one or more alert communication devices via the second communication path in response to determining that the first communication path is inaccessible. The alert management system may be configured to establish a communication channel between two or more client devices via one or more of the first communication path and the second communication path. The alert management system may include at least one client device communicatively coupled to the alert management system. The at least one client device may include a user interface. The alert management system may be configured to provide one or more of an alert signal and a map to the user interface of the at least one client device.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

System Overview

Figure 1:
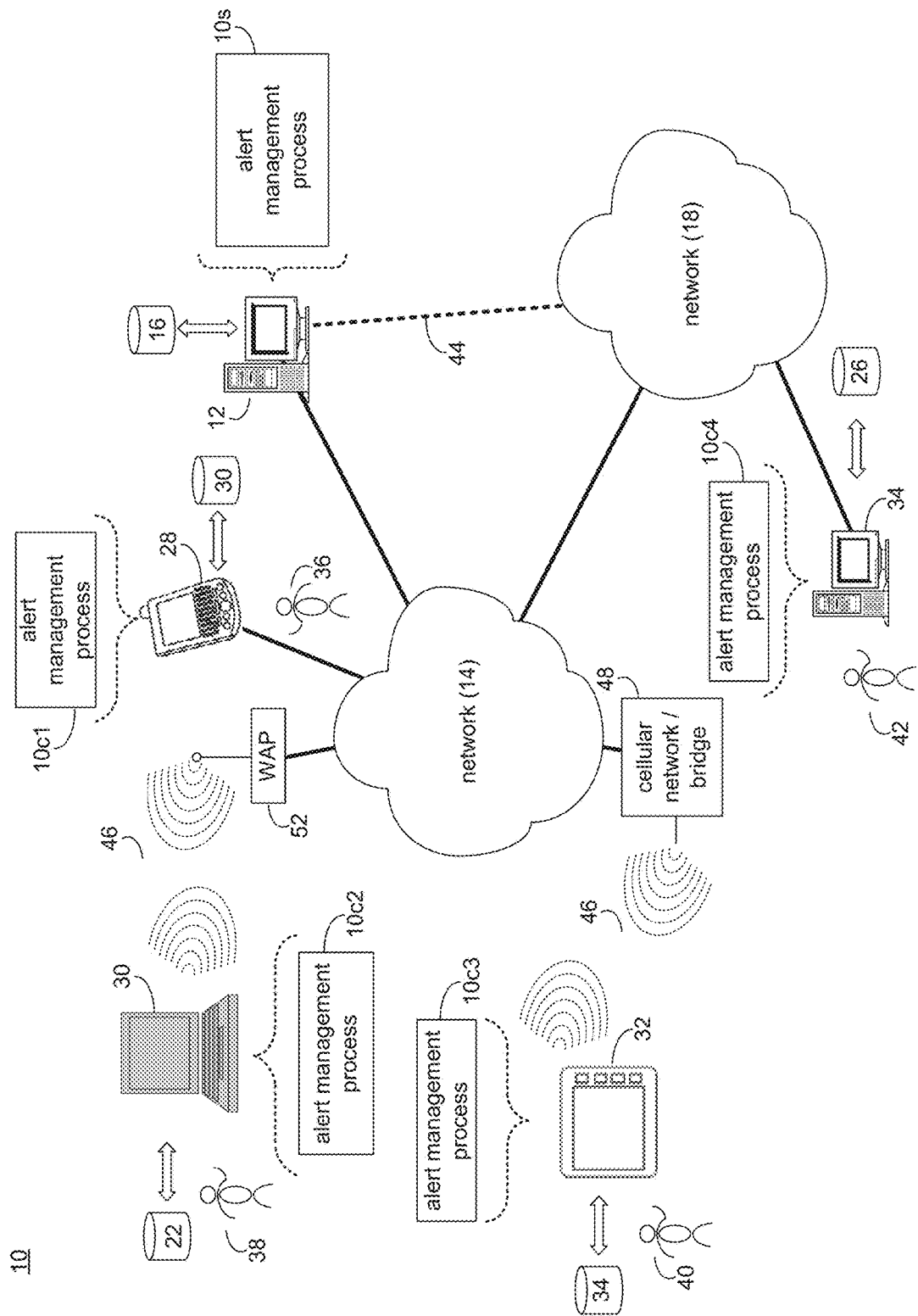
FIG. 1 is a diagrammatic view of a distributed computing network including a computing device that executes an alert management process according to an embodiment of the present disclosure.

In FIG. 1, there is shown alert management process 10. Alert management process 10 may be implemented as a server-side process, a client-side process, or a hybrid server-side/client-side process.

For example, alert management process 10 may be implemented as a purely server-side process via alert management process 10$s$. Alternatively, alert management process 10 may be implemented as a purely client-side process via one or more of alert management process 10$c1$, alert management process 10$c2$, alert management process 10$c3$, and alert management process 10$c4$. Alternatively still, alert management process 10 may be implemented as a hybrid server-side/client-side process via alert management process 10$s$ in combination with one or more of alert management process 10$c1$, alert management process 10$c2$, alert management process 10$c3$, and alert management process 10$c4$. Accordingly, alert management process 10 as used in this disclosure may include any combination of alert management process 10$s$, alert management process 10$c1$, alert management process 10$c2$, alert management process 10$c3$, and alert management process 10$c4$.

Alert management process 10$s$ may be a server application and may reside on and may be executed by computing device 12, which may be connected to network 14 (e.g., the Internet or a local area network). Examples of computing device 12 may include, but are not limited to: a personal computer, a server computer, a series of server computers, a mini computer, a mainframe computer, or a cloud-based computing network.

The instruction sets and subroutines of alert management process 10$s$, which may be stored on storage device 16 coupled to computing device 12, may be executed by one or more processors (not shown) and one or more memory architectures (not shown) included within computing device 12. Examples of storage device 16 may include but are not limited to: a hard disk drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of alert management processes 10$c1$, 10$c2$, 10$c3$, 10$c4$ may include but are not limited to a corporate user interface, a web browser, or a specialized application (e.g., an application running on e.g., the Android™ platform or the iOS™ platform). The instruction sets and subroutines of alert management processes 10$c1$, 10$c2$, 10$c3$, 10$c4$, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage devices 20, 22, 24, 26 may include but are not limited to: hard disk drives; RAID devices; random access memories (RAM); read-only memories (ROM), and all forms of flash memory storage devices.

Examples of client electronic devices 28, 30, 32, 34 may include, but are not limited to: smartphone 28; laptop computer 30; specialty device 32; personal computer 34; a notebook computer (not shown); a server computer (not shown); a dedicated network device (not shown); and a tablet computer (not shown).

Client electronic devices 28, 30, 32, 34 may each execute an operating system, examples of which may include but are not limited to Microsoft Windows™, Android™, iOS™, Linux™, or a custom operating system.

Users 36, 38, 40, 42 may access alert management process 10 directly through network 14 or through secondary network 18. Further, alert management process 10 may be connected to network 14 through secondary network 18, as illustrated with link line 44.

The various client electronic devices (e.g., client electronic devices 28, 30, 32, 34) may be directly or indirectly coupled to network 14 (or network 18). For example, smartphone 28 and laptop computer 30 are shown wirelessly coupled to network 14 via wireless communication channels 44, 46 (respectively) established between smartphone 28, laptop computer 30 (respectively) and cellular network/bridge 48, which is shown directly coupled to network 14. Further, specialty device 32 is shown wirelessly coupled to network 14 via wireless communication channel 50 established between specialty device 32 and wireless access point (i.e., WAP) 52, which is shown directly coupled to network 14. Additionally, personal computer 34 is shown directly coupled to network 18 via a hardwired network connection.

WAP 52 may be, for example, an IEEE 802.11a, 802.11b, 802.11g, 802.11n, Wi-Fi, and/or Bluetooth device that is capable of establishing wireless communication channel 50 between specialty device 32 and WAP 52. As is known in the art, IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth® is a telecommunications industry specification that allows e.g., mobile phones, computers, and personal digital assistants to be interconnected using a short-range wireless connection.

Referring to FIGS. 2-11 and as will be discussed in greater detail below, embodiments of the present disclosure may comprise a blend of hardware, software and wireless technologies to ensure fast, accurate, and reliable emergency communication when it's needed most. From alert activation to alert tracking and updating to secure two-way communication, embodiments of the present disclosure may provide a full complement of capabilities to automate and accelerate the alert and crisis management process.

As will be discussed in greater detail below, an alert can be activated instantly from multiple touchpoints, including mobile and desktop software, as well as a wearable alert activation devices that can be custom-programmed to generate various kinds of alerts (e.g., staff or building-level alerts). Whether a staff requests assistance or a higher-level alert notifying building occupants of a particular state of emergency, embodiments of the present disclosure may empower staff and administrators alike to put desired protocols in motion faster than ever.

In addition, embodiments of the present disclosure may utilize a mesh network of alert communication devices or "hubs" that provide both notifying (e.g., color-coded visual and audible alerts) and locating capability, which extends to exterior coverage, creating a robust security net that reaches places like playgrounds, athletic fields, and parking lots.

As will be discussed in greater detail below and in some implementations, the alert communication devices may not only signal specific emergency response is needed through flashing LEDs, they may also communicate critical locating data to inform response. In some implementations, this information is instantly sent to and presented on multiple devices (desktop/laptop, mobile phone, and TV) in the form of a floor view (single location) and map view (multiple locations), and displays are updated dynamically as changes occur.

Alert Communication Device:

In some implementations and as will be discussed in greater detail below, an alert communication device may generally include a smoke detector-size (6"×6"×1.5") notification and wireless communication device configured to create instant awareness among building occupants by providing audible and color-coded visual notification as well as visual feed that is transmitted directly to the enterprise location. While exemplary dimensions of an alert communication device have been discussed above, it will be appreciated that various dimensions for the alert communication device may be used within the scope of the present disclosure.

Figure 2:
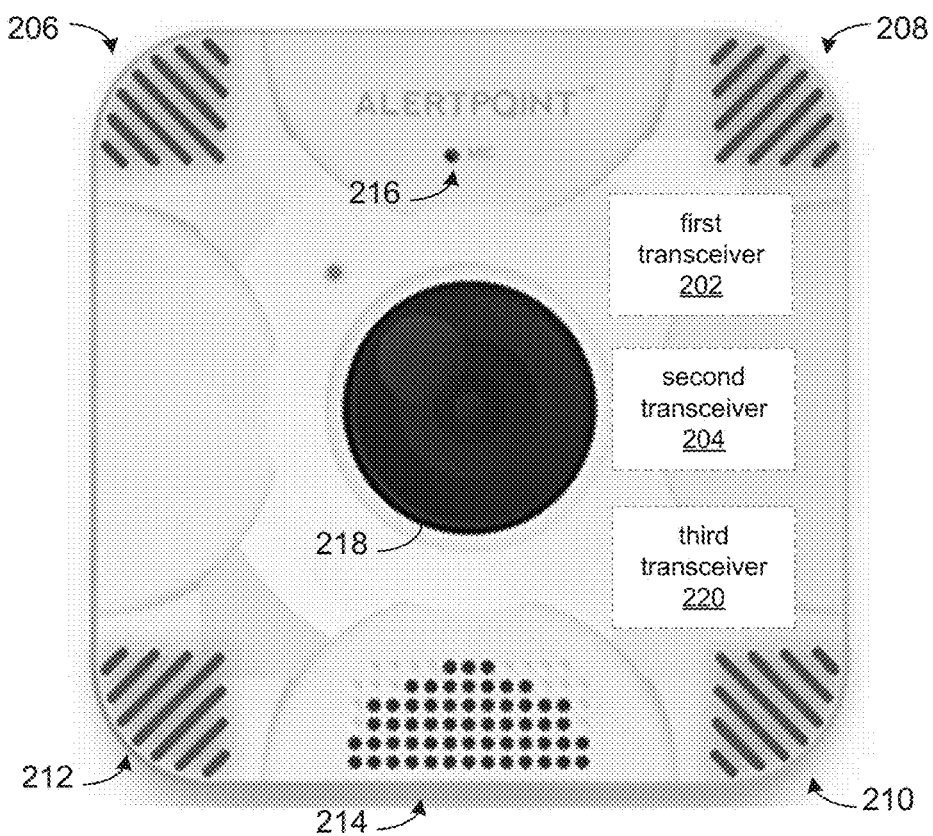
FIG. 2 is a diagrammatic view of an alert communication device according to an embodiment of the present disclosure.

Referring also to FIG. 2 and in some implementations, an alert communication device may include a first transceiver configured to communicatively couple the alert communication device with one or more other alert communication devices via a first communication path. As shown in FIG. 2, first transceiver 202 may be positioned within alert communication device 200. However, it will be appreciated that first transceiver 202 may be positioned on and/or adjacent to the exterior of alert communication device 200. In some implementations, first communication path may be a wireless communication channel utilizing IEEE 802.11x specifications, as discussed above. In this manner, the first transceiver may be a Wi-Fi® module.

Figure 3:
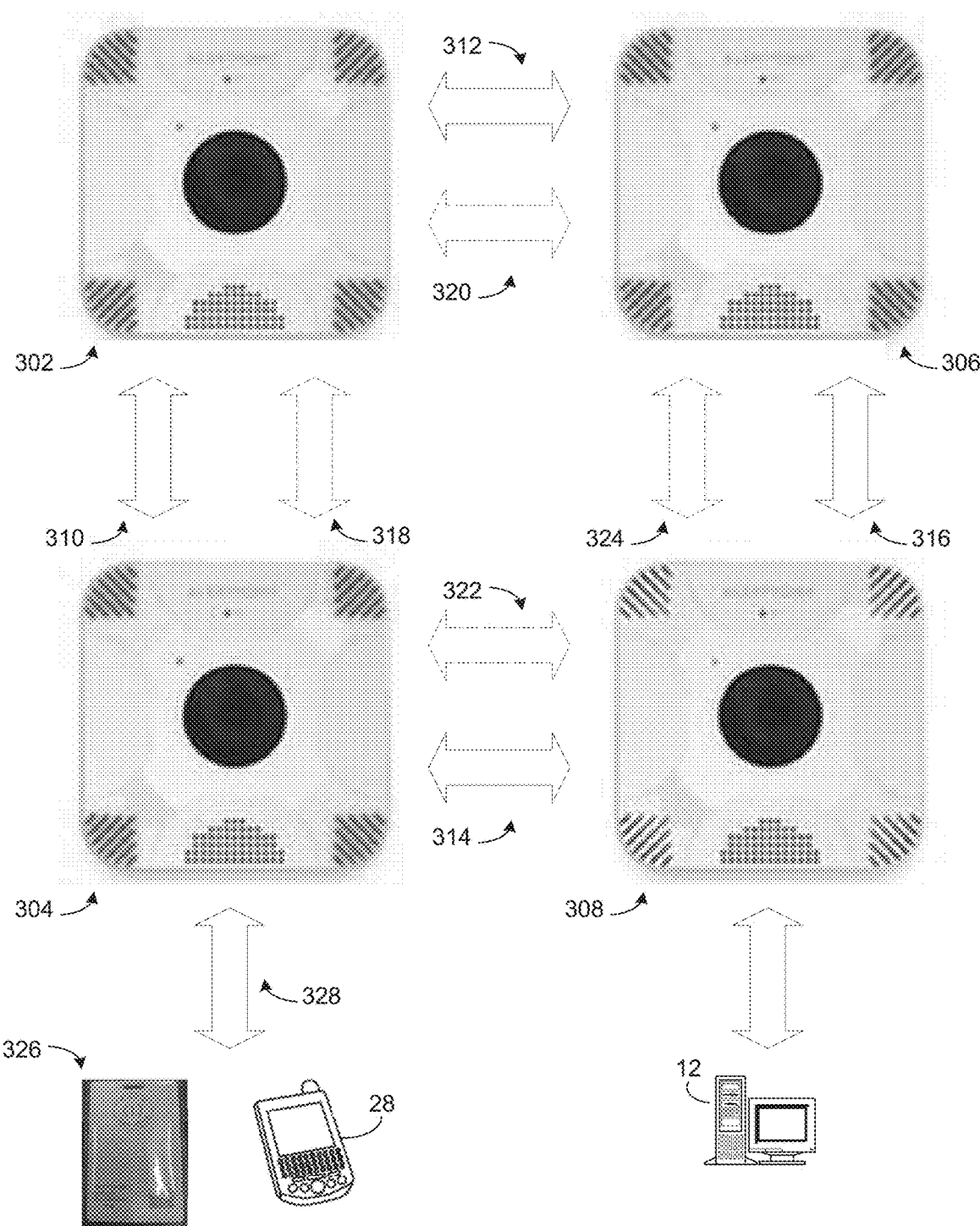
FIG. 3 is a diagrammatic view of an alert management system according to an embodiment of the present disclosure.

Referring also to FIG. 3, a plurality of alert communication devices may be configured to form a "Wi-Fi® mesh" that may allow up to e.g., 1,000 alert communication devices (e.g., alert communication devices 302, 304, 306, 308) to be communicatively coupled together via the first communication path or channel. As will be discussed in greater detail below, the plurality of alert communication devices may be communicatively connected and linked to an alert gateway. While a Wi-Fi® communication path or communication channel has been discussed, it will be appreciated that other communication protocols are within the scope of the present disclosure for implementing the first communication path between the alert communication device and the one or more other alert communication devices (e.g., alert communication devices 302, 304, 306, 308). In some implementations and upon powering of the alert communication device, alert communication device 302 may automatically establish one or more first communication paths (e.g., first communication paths 310, 312) to one or more adjacent or proximate alert communication devices (e.g., alert communication devices 304, 306). In some implementations, each alert communication device may automatically establish the first communication path (e.g., first communication paths 310, 312, 314, 316) with each alert communication device within the operating range of the first transceiver. In this example, even non-adjacent alert communication devices may be communicatively coupled when each alert communication device is within the operating range of the first transceiver. It will be appreciated that the operating range of the first transceiver may be dependent upon many external factors such as distance between alert communication devices, temperature, electromagnetic interference, obstacles, power constraints, etc.

Referring again to FIG. 2 and in some implementations, the alert communication device may include a second transceiver configured to communicatively couple the alert communication device with the one or more other alert communication devices via a second communication path. As shown in FIG. 2, second transceiver 204 may be positioned within alert communication device 200. However, it will be appreciated that second transceiver 202 may be positioned on and/or adjacent to the exterior of alert communication device 200. In some implementations, the second transceiver may include a Zigbee® communication module configured to wirelessly couple alert communication devices. In this manner, the second communication path may define at least a portion of a Zigbee® mesh wireless communication between alert communication devices and/or an alert gateway.

Referring also to FIG. 3 and in some implementations, the second communication path (e.g., second communication paths 318, 320, 322) between the alert communication device (e.g., alert communication device 302) and the one or more other alert communication devices (e.g., alert communication devices 304, 306) may be established by the second transceivers of each alert communication device. While a Zigbee® communication path or communication channel has been discussed, it will be appreciated that other communication protocols are within the scope of the present disclosure for implementing the second communication path between the alert communication device and the one or more other alert communication devices (e.g., alert communication devices 302, 304, 306, 308). For example and in some implementations, the second transceiver may include a 4G LTE SIM card or other cellular transceiver for communicating via cellular signals.

In some implementations and upon powering of the alert communication device, alert communication device 302 may automatically establish one or more second communication paths (e.g., first communication paths 318, 320) to one or more adjacent or proximate alert communication devices (e.g., alert communication devices 304, 306). In some implementations, each alert communication device may automatically establish the second communication path (e.g., second communication paths 318, 320, 322, 324) with each alert communication device within the operating range of the second transceiver. In this example, even non-adjacent alert communication devices may be communicatively coupled when each alert communication device is within the operating range of the second transceiver. It will be appreciated that the operating range of the second transceiver may be dependent upon many external factors such as distance between alert communication devices, temperature, electromagnetic interference, obstacles, power constraints, etc.

In some implementations, each alert communication device may be connected to every other alert communication device for built in redundancy. For example, if an alert communication device fails, other alert communication devices can pick up the function of the failed alert communication device up to a distance of e.g., 1.5 kilometers. It will be appreciated that various distances for redundancy of alert communication devices are possible within the scope of the present disclosure. In some implementations, each alert communication device may uses smoothing technology to allow for exact identification of an alert activation device and location of an event even if one or more of the alert communication devices fail. In some implementations, if an alert communication device does fail, the failure is automatically communicated to the a gateway coordinator (e.g., alert gateway) and/or user on site in real time.

As will be discussed in greater detail below and in some implementations, the second communication path may include a communication protocol that is separate or different from the communication protocol of the first communication path (e.g., a first communication path established between e.g., Wi-Fi® transceivers and a second communication path established between e.g., Zigbee® transceivers.

Figure 4:
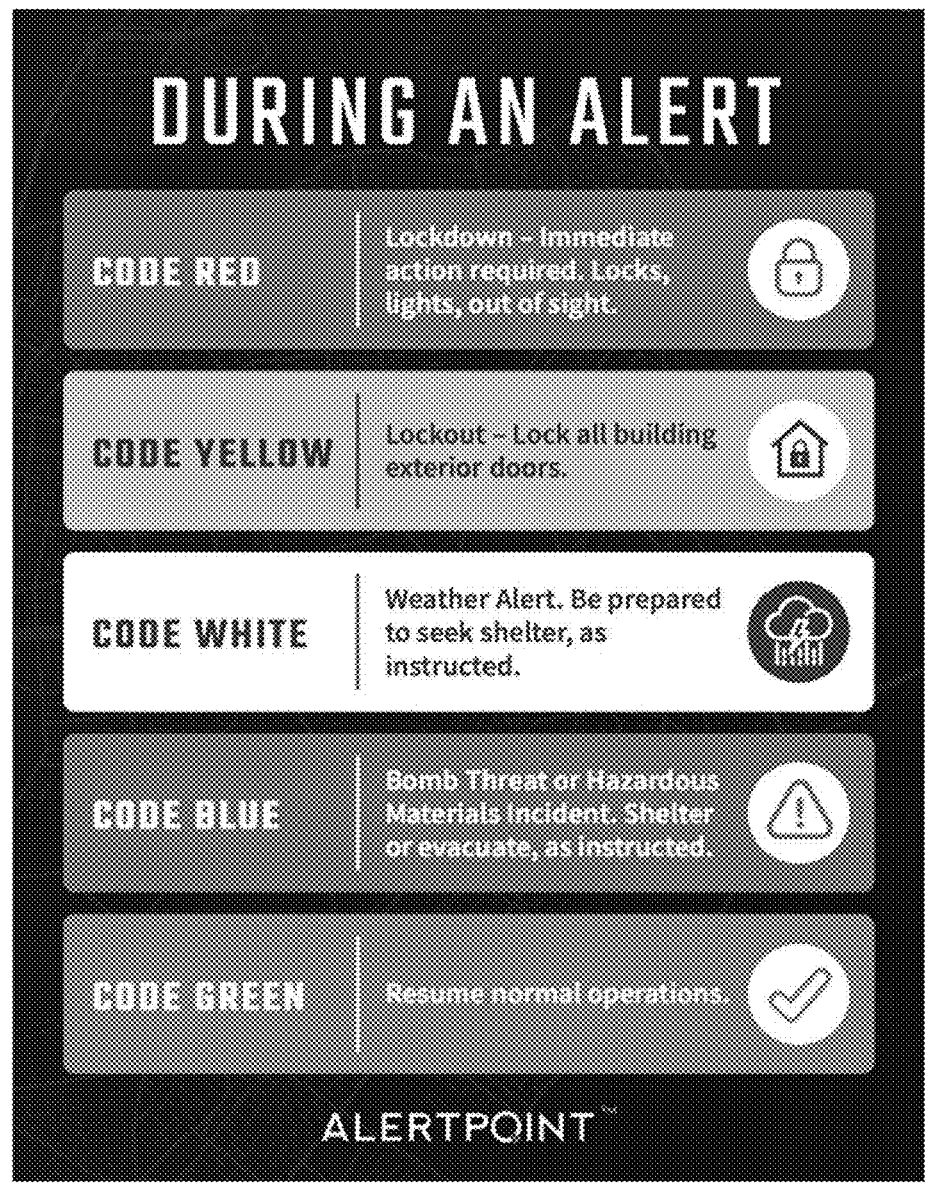
FIG. 4 is a diagrammatic view of various alert events according to an embodiment of the present disclosure.

Returning to FIG. 2 and in some implementations, the alert communication device may include one or more of a visual alert system and an audio alert system. In this manner, alert communication device may also provide alert signals through one or more visual alerts and one or more audio alerts. In some implementations, alert communication device 200 may include a visual alert system in the form of a plurality of electronically-controlled lights configured to provide a plurality of visual alerts. For example, a plurality of electronically-controlled lights (e.g., electronically-controlled lights 206, 208, 210, 212) may be positioned on the exterior of alert communication device 200. In some implementations, the visual alert system may be configured to receive an alert signal and provide visual alerts (e.g., flashing lights) in a color and/or pattern corresponding to the alert signal. For example, the visual alert system may include highly visible multi-color LEDs that can be programmed to match the desired color, audio, and flashing characteristics of each alert. In some implementations and as shown in FIG. 4, five distinct colors may be displayed by visual alert system to identify the following alert events:

| | |
|---|---|
| Lockdown | (Code Red) |
| Lockout | (Code Yellow) |
| Hold | (Code White) |
| Shelter | (Code Blue) |
| Evacuate | (Code Green) |

While five example alert events and corresponding colors have been discussed, it will be appreciated that any number of alerts and corresponding colors may be used within the scope of the present disclosure to represent any alert event(s).

In some implementations, the audio alert system may include one or more speakers or buzzers within and/or on the exterior of the alert communication device. For example, speaker 214 may be configured to provide one or more audio alerts (e.g., sirens, whistling, voice commands, etc.) in response to receiving an alert signal at the alert communication device (e.g., alert communication device 200). With the above-described visual alert system and/or audio alert system, critical information can be seen and heard on multiple platforms. In some implementations, the audio alert system may be combined with built-in text-to-speech capability to provide speech alerts in response to text alert signals received by alert communication devices. In some implementations, the alert communication device may include a microphone (e.g., microphone 216) for recording audio signals adjacent to the alert communication device.

In some implementations, the alert communication device may include a camera system for providing a video feed and/or images of an area adjacent to the alert communication device. For example, camera system 218 may include an embedded 360° camera configured to record video and/or configured to generate a plurality of images. In some implementations, the video feed may be automatic (e.g., constant, in response to receiving an alert signal from within a predefined distance threshold, and/or in response to a command received from a client device to record video and/or images).

In some implementations, the alert communication device may include a third transceiver configured to communicatively couple the alert communication device with one or more alert activation devices via a third communication path. As shown in FIG. 2, third transceiver 220 may be positioned within alert communication device 200. However, it will be appreciated that third transceiver 220 may be positioned on and/or adjacent to the exterior of alert communication device 200. In some implementations, the third transceiver may be a Bluetooth Low Energy® transceiver. As is known in the art, Bluetooth Low Energy® or BLE is a specification that allows radio frequency communication between various types of devices. For example, devices may provide advertising packets or signals that may be received by scanning devices. These advertising packets may be sent without a formal pairing between devices. In this manner and as will be discussed in greater detail below, alert activation devices may provide alert signals to the alert communication device without pairing to a specific alert communication device. Referring also to FIG. 3 and in some implementations, the third transceiver (e.g., third transceiver 220) may be configured to receive alert signals from an alert activation device (e.g., alert activation device 326) and/or a client device (e.g., client device 28) via the third communication path (e.g., third communication path 328). For example and through a user interface provided to a client device, a user may initiate an alert signal by selecting one or more buttons in the user interface.

In some implementations, the third transceiver (e.g., third transceiver 220) may be configured to determine the location of the one or more alert activation devices relative to the alert communication device. For example and in some implementations, the alert communication device may determine the location of the alert activation device relative to the alert communication device based upon, at least in part, the alert signal received by the third transceiver (e.g., third transceiver 220). In this manner, the alert communication device may communicate with applications and the wearable alert activation device to determine personnel location. In some implementations, the alert communication device may also provide tracking capability by functioning as a locating beacon. In some implementations, the alert communication device may deliver the specific nature of the alert (i.e.: anything from a confrontation with a student or customer to the identification of an armed intruder).

In some implementations, the alert communication device may be configured to receive an alert signal from the one or more alert activation devices. In some implementations and referring also to the example of FIG. 5, a plurality of alert communication devices (e.g., alert communication devices 502, 504, 506, 508) may be positioned throughout a school building (e.g., school building 510). The alert communication devices (e.g., alert communication devices 502, 504, 506, 508) may be mounted to e.g., the ceiling throughout the building. As will be discussed in greater detail below, the alert communication devices (e.g., alert communication devices 502, 504, 506, 508) may be communicatively coupled to an alert gateway (e.g., alert gateway 510). In some implementations, members of the school staff may have access to an alert activation device (e.g., alert activation device 514) and/or a client device (e.g., client device 28). In some implementations, alert communication device 502 may be configured to receive an alert signal from an alert activation device (e.g., alert activation device 514). As discussed above, the alert signal may be received by the third transceiver of alert communication device 502 via the third communication path (e.g., third communication path 516). In some implementations, the alert communication device may be configured to transmit the alert signal to the one or more other alert communication devices via the first communication path. In this example, alert communication device 502 may be configured to transmit the alert signal to another alert communication device (e.g., alert communication device 504) in response to receiving the alert signal (e.g., via third communication path 516).

In some implementations, the alert communication device may be configured to indicate at least a portion of an access path between a predefined first location and a location of the first alert activation device in response to receiving the alert signal from the first alert activation device. Referring also to the example of FIG. 6 and in some implementations, suppose that an alert signal is received from an alert activation device (e.g., alert activation device 514). In this example, an alert communication device that receives the alert signal (e.g., alert communication device 502) may indicate at least a portion of an access path between a predefined first location and the location of the alert activation device (e.g., alert activation device 514). Indicating at least a portion of an access path may generally include illuminating a portion of the alert communication device (e.g., via visual alerts), broadcasting audible instructions, and/or otherwise marking a portion of an access path between a predefined first location and the location of the alert activation device (e.g., alert activation device 514). In some implementations, the predefined first location may be an entrance or area of a structure or building. However, it will be appreciated that the predefined first location may be any location (e.g., an administrator's office, a security office, etc.).

For example, suppose alert activation device is activated in e.g., a classroom. In some implementations, the most adjacent alert communication device (e.g., alert communication device 502) may indicate at least a portion of an access path (e.g., via the plurality of electronically-controlled lights turning e.g., blue). In some implementations, alert communication devices in the access path between the e.g., classroom with alert activation device 514 and e.g., a front door may also indicate portions of the access path (e.g., via the plurality of electronically-controlled lights of each alert communication device turning e.g., blue). In some implementations, access paths may be manually predefined or automatically defined by the alert communication devices along corridors, walkways, etc. For example, an access path starting point may be defined based upon, at least in part, user selection. For example, suppose alert communication devices are deployed in a school. Examples of access path starting points may generally include a front door, a principal's office, etc. It will be appreciated that any location may be defined as an access path starting point. In some implementations, the access path destination point may automatically be defined as the alert communication device closest to where the alert activation device is activated. For example, if a teacher in room 500 activates the alert activation device, that alert communication device in that room may automatically be the access path destination point. Accordingly, the alert communication device may indicate at least a portion of an access path to allow an administrator, an EMT, a police officer, etc. to get to the room quickly by simply following the markings of multiple alert communication devices.

In some implementations, the alert communication device may be configured to determine that the first communication path is inaccessible. Referring again to FIG. 3 and in some implementations, an alert communication device (e.g., alert communication device 302) may be configured to determine that the first communication path (e.g., first communication path 310 between alert communication device 302 and alert communication device 304) is inaccessible (e.g., by determining that the first transceiver is not able to send or receive signals via the first communication path). In some implementations, the alert communication device may be configured to transmit the alert signal to the one or more alert communication devices via the second communication path in response to determining that the first communication path is inaccessible. For example, in response to determining that the first communication path is inaccessible, alert communication device 302 may transmit an alert signal via the second communication path (e.g., second communication path 318 between alert communication device 302 and alert communication device 304).

Figure 7:
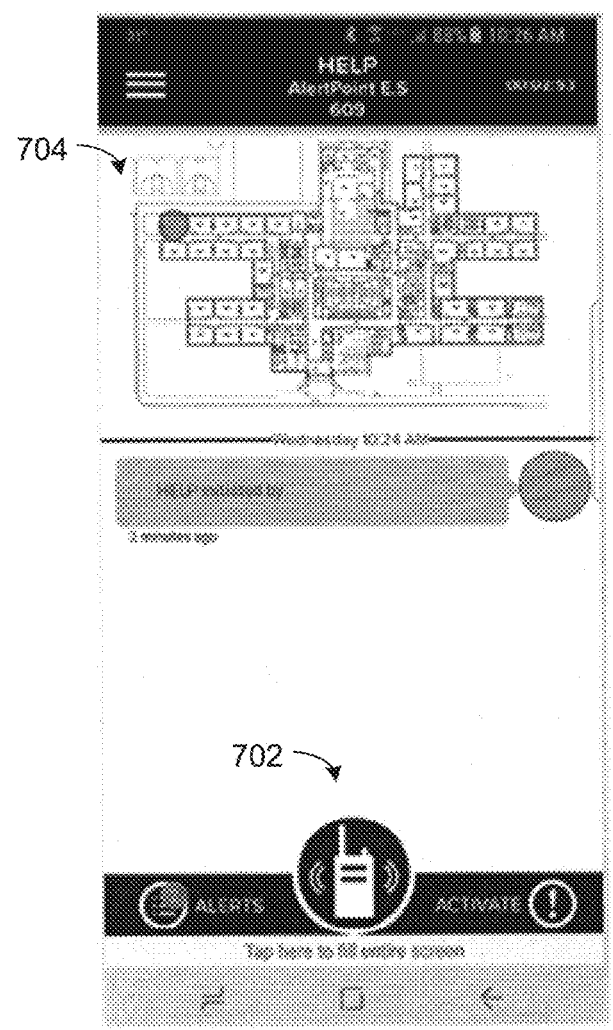
FIG. 7 is a diagrammatic view of a user interface generated on a client device according to an embodiment of the present disclosure.

In some implementations, the alert communication device may be configured to establish a communication channel between two or more client devices via one or more of the first communication path and the second communication path. In some implementations, to streamline communication among crisis managers, first responders and other key stakeholders, alert communication devices may provide two-way communication to client devices over a secure channel. Referring again to the example of FIG. 3 and in some implementations, client device 28 may be communicatively coupled to alert communication device 304 and client device 12 may be communicatively coupled to alert communication device 308. In some implementations and via one or more of the first communication path and the second communication path between alert communication device 304 and alert communication device 308, a communication channel may be established between client device 28 and client device 28. Referring also to FIG. 7 and in some implementations, alert management process 10 may provide a user interface or application (e.g., user interface 700) on a client device to establish a communication channel between client devices. For example, a user may select a button (e.g., button 702). In some implementations, the button may be a touchscreen button or a physical button on the client device. In some implementations, alert communication devices may integrate with existing radios to facilitate the same functionality without the need to change communication devices.

Figure 8:
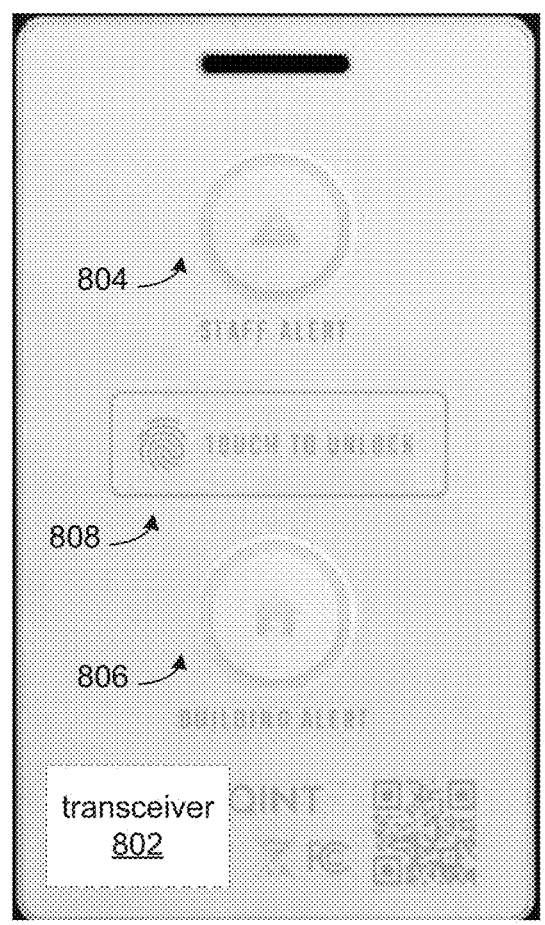
FIGS. 8-10 are diagrammatic views of an alert activation device according to various embodiments of the present disclosure.

Alert Activation Device:

In some implementations, an alert activation device may be used by a user to generate an alert signal. In some implementations, the alert activation device may include a transceiver configured to communicatively couple the alert activation device to at least one alert communication device. For example and as shown in FIG. 8, an alert activation device (e.g., alert activation device 800) may include a transceiver configured to communicatively couple the alert activation device to at least one alert communication device. In some implementations, the transceiver may be embedded within the alert activation device and/or be positioned on the exterior of the alert activation device. It will be appreciated that the transceiver (e.g., transceiver 802) may be positioned in a variety of ways relative to the alert activation device within the scope of the present disclosure.

Figure 9:
Figure 10:
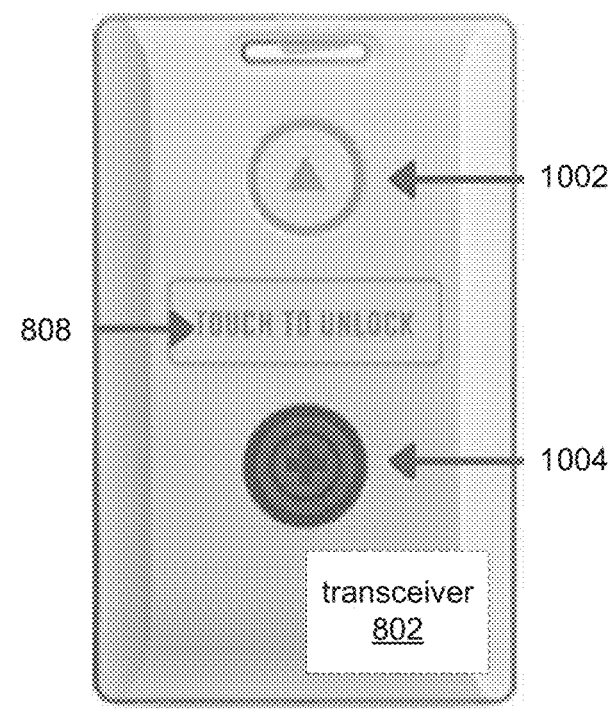

In some implementations, the alert activation device may include an activation button communicatively coupled to the transceiver. In some implementations, the alert activation device may include two or more activation buttons communicatively coupled to the transceiver where each alert activation button defines a different group of recipients for the alert signal. Referring also to the example of FIG. 8 and in some implementations, the two or more activation buttons (e.g., activation buttons 804, 806) may occupy at least two portions of an exterior surface of the alert activation device. It will be appreciated that various sizes and positions may be used for the activation button within the scope of the present disclosure. In some implementations, the alert activation device may include an unlock button (e.g., unlock button 808). Unless and until a user presses the unlock button, the alert activation device may not provide any alert signals. This may prevent inadvertent alert signals from being sent by a user. For example, a user may press or touch the "Touch to Unlock" button to unlock the alert activation device. Referring also to FIG. 9 and in response to the user pressing the "Touch to Unlock" button, each of the two or more activation buttons may illuminate (e.g., each button is illuminated by a green light) for a predefined activation period of time (e.g., five seconds). If no other button is pressed during the predefined activation period of time, the alert activation device may return to a locked state where selection of one or more of the activation buttons does not transmit an alert signal. If a user selects an activation button and holds the activation button for a predefined press period of time (e.g., two seconds) within the predefined activation period of time, the alert activation device may transmit an alert signal to an alert communication device via the transceiver. In some implementations and in response to a user selecting an activation button, the alert activation device may vibrate (e.g., via a built-in vibrating device or vibrator). In some implementations, the vibrator may indicate to a user that the alert signal is being transmitted. The duration and style of the vibration may be configured by a user (e.g., using a client device application). In some implementations, a unique vibration style and duration may be utilized for each activation button such that pressing a first activation button results in a first vibration style and duration while pressing a second activation button results in a second vibration style and duration.

In some implementations, different types of alert signals may be activated based upon, at least in part, specific activation button press configurations. For example and as discussed above, a user may activate a first type of alert signal by unlocking the alert activation device and pressing a first activation button (e.g., activation button 804) for the predefined press period of time (e.g., two seconds). An example of a first type of alert signal may include a "staff alert" where a staff member may request assistance in e.g., a classroom. For a second, more serious type of alert, such as a building-wide alert, a second activation button press configuration may be required. For example, a user may activate a second type of alert signal by unlocking the alert activation device and pressing two activation buttons (e.g., activation buttons 804, 806) at the same time for the predefined press period of time (e.g., two seconds). In this manner, inadvertently transmitting serious types of alert signals may be prevented by requiring a more involved activation button press configuration. While two activation buttons and two activation button press configurations have been described, it will be appreciated that any number of activation buttons and activation button press configurations may be used within the scope of the present disclosure.

In some implementations, the alert activation device may be a wearable alert activation device. For example, the alert activation device may be designed for instant accessibility and multi-function wireless communication capability. In some implementations, the alert activation device may be an ID/access card-size (e.g., 3⅜"×2⅛"×⅛") wearable alert device. While exemplary dimensions of an alert activation device have been discussed above, it will be appreciated that various dimensions for the alert activation device may be used within the scope of the present disclosure. In some implementations, the alert activation device may be configured to be affixed to an identification badge. For example, it can be discreetly affixed behind an identification badge and quickly engaged to initiate an alert.

In some implementations, the transceiver may be configured to transmit a location of the alert activation device when transmitting the alert signal. As discussed above and in some implementations, the transceiver may be a Bluetooth® Low Energy transceiver. With integrated Bluetooth Low Energy®, the alert activation device may allow beaconing capability for device locating. This functionality may support the capture and reporting of critical information, thus shortening response times and facilitating real-time incident updates. In some implementations, the Bluetooth® technology may connect with an alert communication device up to 1.5 kilometers away.

In some implementations, each alert activation device may be associated with a user. For example, by associating each device to the wearer, the identity of the alert initiator can be communicated along with the alert signal. In some implementations, each alert activation device may have a unique identifier that lets a gateway coordinator know who pressed the alert button(s) and where they are located. In some implementations, the alert activation device may have a "battery weak" light that may also be monitored at an alert gateway coordinator level to ensure the system is always working. In some implementations, alert activation devices may have a wireless charging option as well that eliminates the need for replacing batteries or a battery monitoring function.

In some implementations, the transceiver may be configured to transmit a general alert signal when a first button of the two or more buttons is engaged and may be configured to transmit a medical alert signal when a second button of the two or more buttons is engaged. Referring also to the example of FIG. 10 and in some implementations, transceiver 802 may be configured to transmit a general alert signal when a first button (e.g., first activation button 1002) is engaged and may be configured to transmit a medical alert signal when a second button (e.g., second activation button 1004) is engaged. For example, alert activation device 1000 may include a blue colored button (e.g., second activation button 1004) to signify a medical issue. After a user unlocks the alert activation device (e.g., via unlock button 808) and presses the blue button by itself, alert activation device 1000 may transmit, via transceiver 802, a medical alert signal to an adjacent alert communication device.

In some implementations, the at least one alert communication device may be configured to indicate at least a portion of an access path between a predefined first location and the location of the alert activation device when transmitting the medical alert signal. Referring again to the example of FIG. 6 and in some implementations, in response to a user engaging second activation button 1004, alert activation device 1000 may transmit, via transceiver 802, a medical alert signal to an adjacent alert communication device (e.g., alert communication device 502). In some implementations and as discussed above, the most adjacent alert communication device (e.g., alert communication device 502) may indicate at least a portion of an access path (e.g., via the plurality of electronically-controlled lights turning e.g., blue). In some implementations, alert communication devices in the access path between the e.g., classroom with alert activation device 514 and e.g., a front door may also indicate portions of the access path (e.g., via the plurality of electronically-controlled lights of each alert communication device turning e.g., blue). Accordingly, the alert communication device may indicate at least a portion of an access path to allow an administrator, an EMT, a police officer, etc. to get to the room with the alert activation device (e.g., alert activation device 1000) quickly by simply following the markings of multiple alert communication devices.

Figure 5:
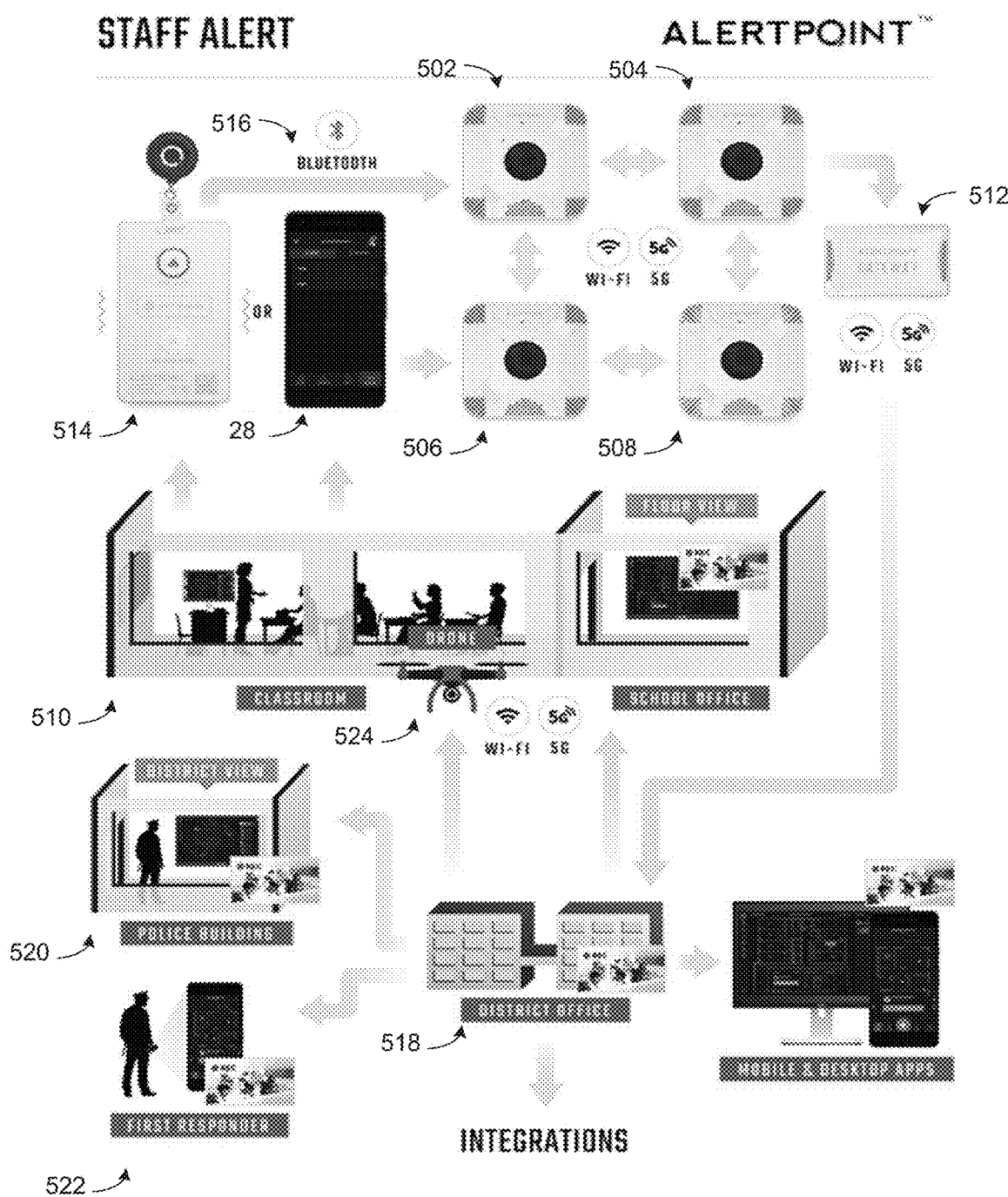
FIGS. 5-6 are diagrammatic views of an alert management system according to various embodiments of the present disclosure.
Figure 6:
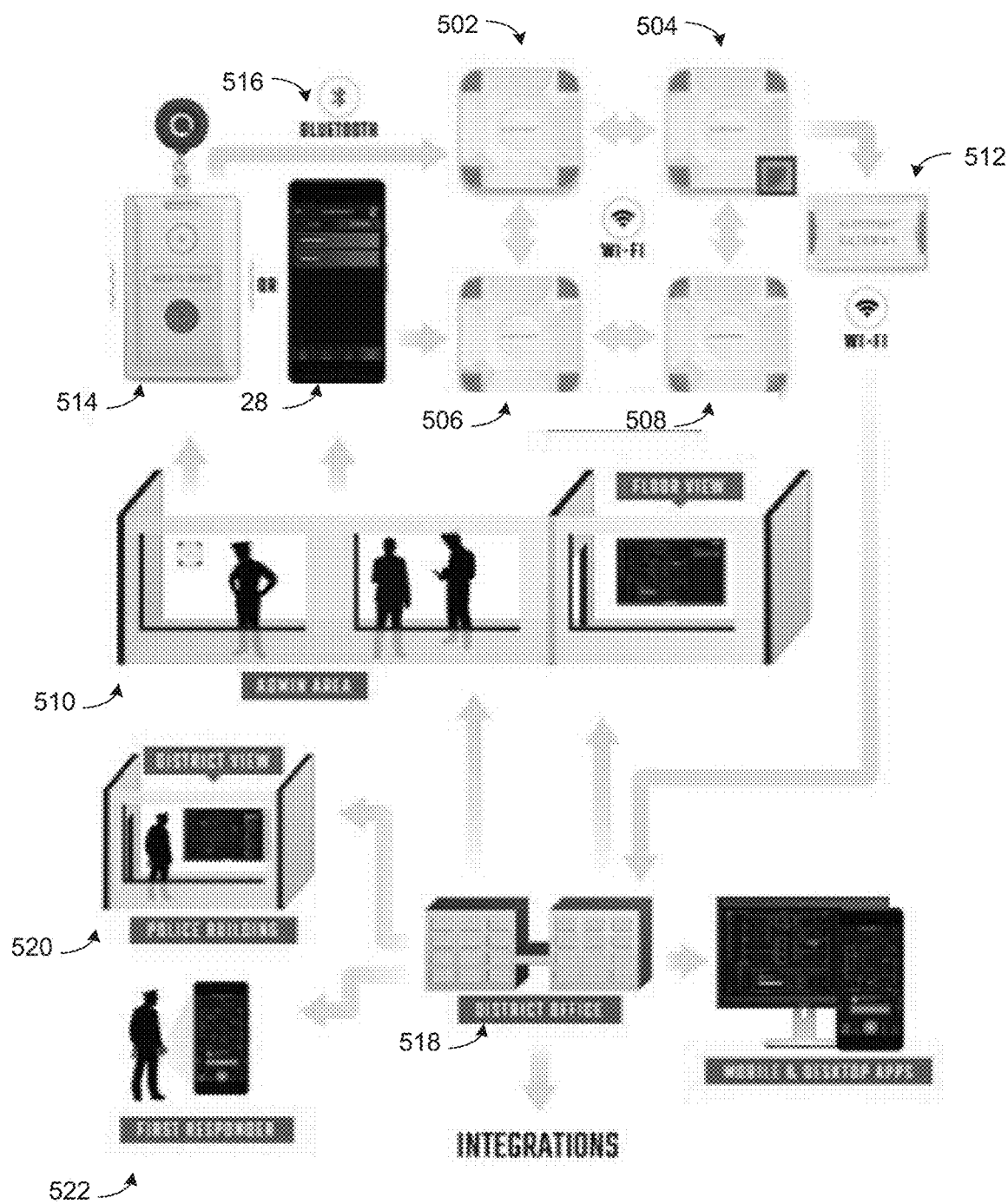
Figure 11:
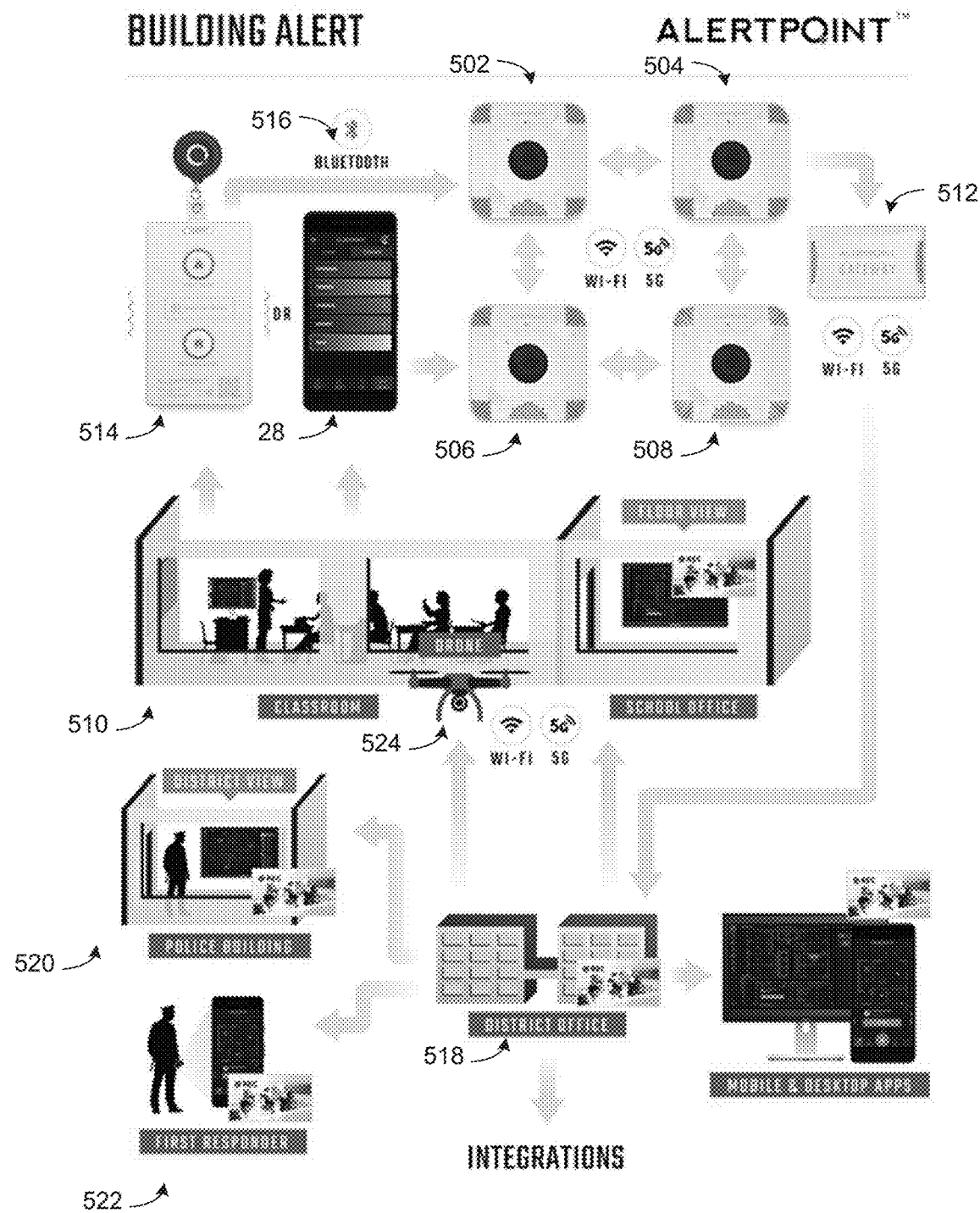
FIG. 11 is a diagrammatic view of an alert management system according to various embodiments of the present disclosure.

Alert Management System:

In some implementations, an alert management system may include one or more alert communication devices communicatively coupled to one or more other alert communication devices and configured to provide one or more of a visual alert and an audio alert. Referring also to FIGS. 5 and 11, the alert management system (e.g., alert management system 500) may include one or more alert communication devices communicatively coupled to one or more other alert communication devices (e.g., alert communication devices 502, 504, 506, 508). As discussed above, the one or more alert communication devices may be configured to provide one or more of a visual alert and an audio alert. In some implementations, FIG. 5 may describe a first type of alert (e.g., a staff alert) and FIG. 11 may describe a second type of alert (e.g., a building alert).

In some implementations, the alert management system may include one or more alert activation devices communicatively coupled to at least one alert communication device of the one or more alert communication devices. For example, the alert management system (e.g., alert management system 500) may include one or more alert activation devices (e.g., alert activation devices 514) communicatively coupled to at least one alert communication device (e.g., alert communication devices 502).

In some implementations, the alert management system may further include one or more alert gateways. In some implementations, the one or more alert communication devices may be communicatively coupled to the one or more alert gateways. For example, the alert management system (e.g., alert management system 500) may include one or more alert gateways (e.g., alert gateway 512) configured to interconnect the one or more alert communication devices with one or more external resources. For example, alert gateway may be configured to provide the alert signals from the one or more alert communication devices to a district office (e.g., district office 518), a police building (e.g., police building 520), first responders (e.g., first responders 522), and/or to mobile and desktop applications of alert management process 10. In this manner, the alert signals of the alert management system may be provided for external resources to access and to process. For example and in some implementations, at least one client device may be communicatively coupled to the alert management system. In some implementations, the at least one client device may include a user interface.

In some implementations, alert management system 500 may be configured to provide one or more of an alert signal and a multi-location map to the user interface of the at least one client device. A multi-location map may generally include a plurality of maps of a building, park, playground, or other area of interest associated with an alert signals. From this alert signal and multi-location map, users associated with the alert signal may provide support and/or initiate one or more emergency procedures. Referring again to FIG. 7, each client device may include a user interface (e.g., user interface 700) with a multi-location map (e.g., multi-location map 704) configured to show the location of the origin of an alert signal.

In some implementations, the external resources may generally include one or more drones (e.g., drone 524) configured to provide surveillance information when an intruder is identified. For example and in some implementations, the one or more drones may have Artificial Intelligence (AI) facial recognition capability and can send real time information feed to a gateway network coordinator on site and to first responders if requested. In this manner, the one or more drones (e.g., drone 524) can be used to provide weekend and holiday security alerting the security enterprise center if there is any trespass on the school or business campus thus freeing up valuable security resources that would otherwise have to monitor the buildings. In some implementations, the alert management system may also have options that include the use of drone capability with facial recognition software that allows for the tracking of any intruder(s) and delivering real time information back to a gateway network coordinator on site as well as the option to communicate this information directly to first responders to greatly reduce the response time and reaction to a security event.

In some implementations, alert management process 10 may be composed of applications across multiple platforms: Web (server side), Desktop and Mobile (client side). In some implementations, everything from user management to location mapping to alert and device configuration may be accessed from any Web browser because of the one or more alert gateways. For example, desktop client applications may be installed on a computing device and may provide alert notification and activation functionality, along with full crisis management capability. In some implementations, this may include secure communication (e.g., audio/visual interaction and direct messaging) functions, plus building floor plan and multi-location map displays indicating impacted areas, with real-time information updating. It may also include quick access to emergency plans and procedures for reference. In some implementations, alert management system may provide customizable analytics/reports to any authorized personnel. These reports can be exported to show the following data:

The location of each event;
The building associated with each event;
The room within the building associated with each event;
The personnel that triggered the alert;
The time and date of each alert;
Reports how long each alert took from start to close;
Differentiates between staff and first responders in reports; and/or
The reason for the alert (i.e. fight, intruder etc.)

In some implementations and as discussed above, the one or more alert communication devices may include a plurality of alert communication devices and may be configured to communicatively couple the alert communication device with one or more other alert communication devices of the plurality of alert communication devices via a first communication path. In some implementations, the one or more alert communication devices may be configured to communicatively couple the alert communication device with the one or more other alert communication devices of the plurality of alert communication devices via a second communication path.

Figure 12:
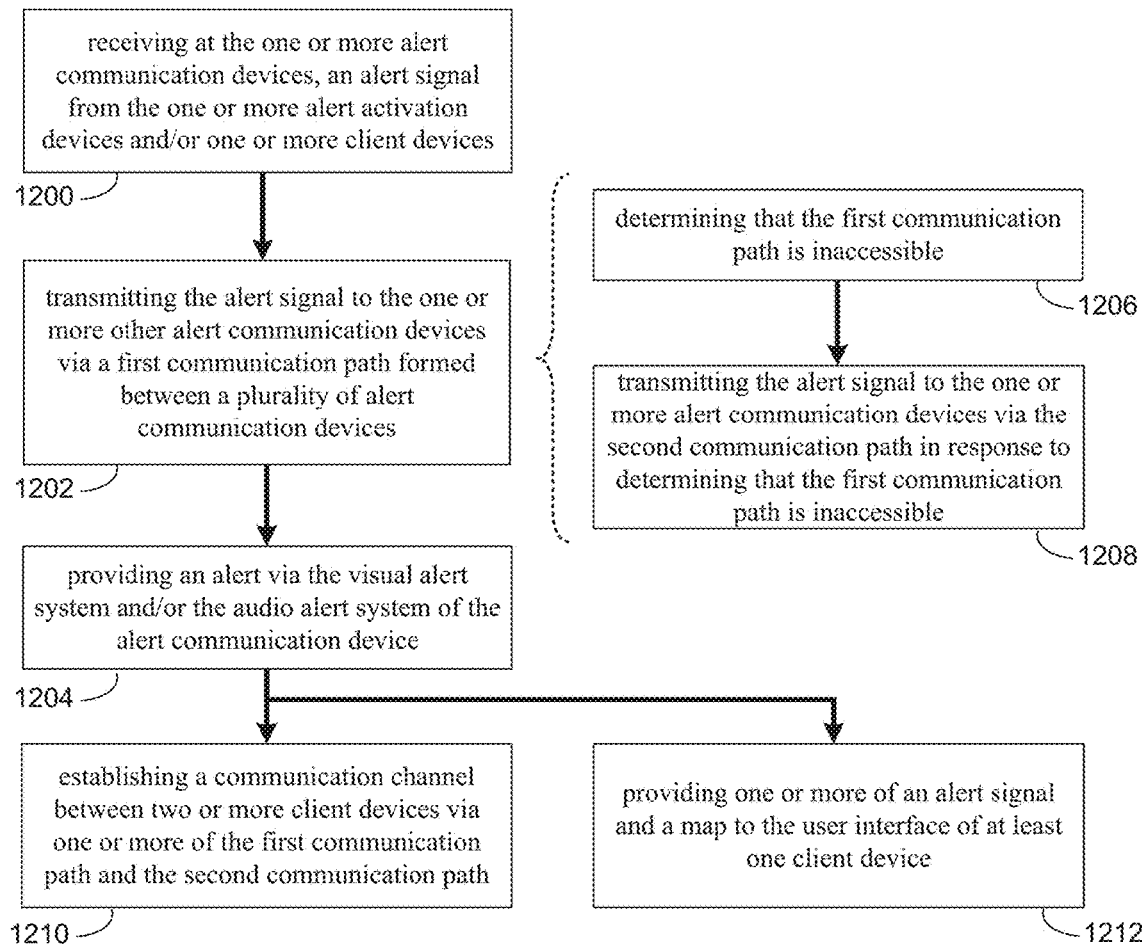
FIG. 12 is a flowchart of another embodiment of the alert management process of FIG. 1 according to an embodiment of the present disclosure.

Alert Management Process:

In some implementations and as discussed above, alert management process 10 may reside on and may be executed by storage system 12; and may be configured to process the above-described alert signals through the alert management system. For example and referring also to FIG. 12, alert management process 10 may be configured to receive 1200, at the one or more alert communication devices, an alert signal from the one or more alert activation devices and/or one or more client devices, transmit 1202 the alert signal to the one or more other alert communication devices via a first communication path formed between a plurality of alert communication devices, and provide 1204 an alert via the visual alert system and/or the audio alert system of the alert communication device. In some implementations and as discussed above, alert management process 10 may be configured to determine 1206 that the first communication path is inaccessible and transmit 1208 the alert signal to the one or more alert communication devices via the second communication path in response to determining that the first communication path is inaccessible. For example, the alert management system may be designed to operate independently from a customer network. The communication mesh (e.g., mesh of alert communication devices) may be distinct from the host network but may be designed to integrate with that network. In some implementations, the alert management system may be secured by encryption technology from any outside interference/hacking of the network.

In some implementations and as discussed above, alert management process 10 may be configured to establish 1210 a communication channel between two or more client devices via one or more of the first communication path and the second communication path.

In some implementations, the alert management system may provide the same notification, alert management and communication functions as the desktop application, including push-to-talk two-way radio capability on a secure communication channel to any client device. In some implementations, alert management process 10 may transmit visual information of an event directly to the gateway coordinator and, if necessary, to first responders from the camera system built into the alert communication device of each alert communication device. In some implementations and as discussed above, alert management process 10 may be configured to provide 1212 one or more of an alert signal and a map to the user interface of at least one client device.

In some implementations, alert management process 10 may capture and record all incident data—including an alert cause—to guide a "forensic review" of an event for investigative purposes as well as supporting updated protocols for future crises.

In some implementations and as discussed above, the alert management system may be configured to, via alert management process 10, receive, at the one or more alert communication devices, an alert signal from a first alert activation device of the one or more alert activation devices. The alert management system may be configured to, via alert management process 10, indicate, via the one or more alert communication devices, an access path between a predefined first location and a location of the first alert activation device in response to receiving the alert signal from the first alert activation device.

Figure 13:
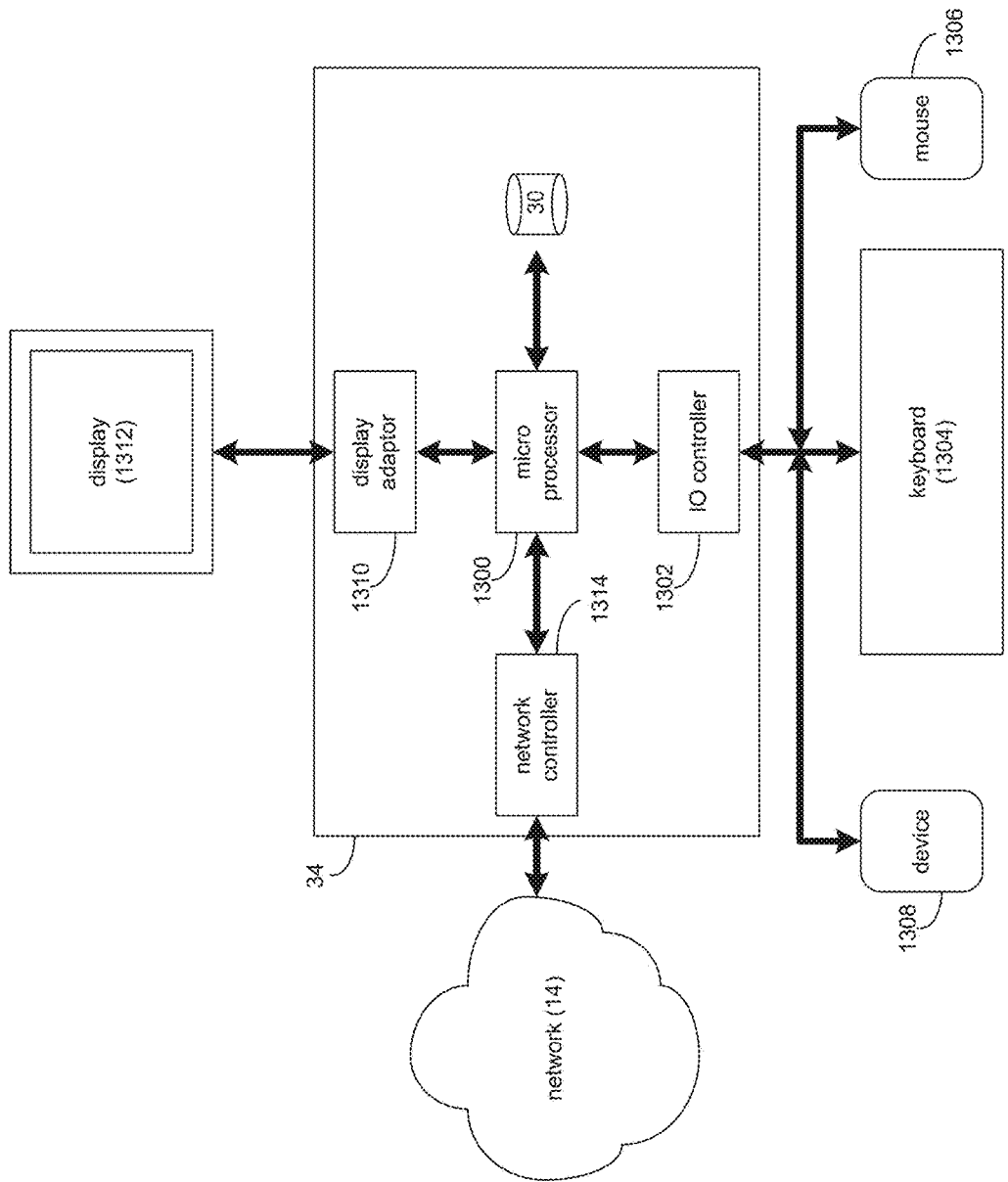
FIG. 13 is a diagrammatic view of a client electronic device executing the alert management process of FIG. 1 according to an embodiment of the present disclosure.

Referring also to FIG. 13, there is shown a diagrammatic view of client electronic device 34. While client electronic device 34 is shown in this figure, this is for illustrative purposes only and is not intended to be a limitation of this disclosure, as other configurations are possible. For example, any computing device capable of executing, in whole or in part, alert management process 10 may be substituted for client electronic device 34 within FIG. 13, examples of which may include but are not limited to computing device 12 and/or client electronic devices 28, 30, 32.

Client electronic device 34 may include a processor and/or microprocessor (e.g., microprocessor 1300) configured to, e.g., process data and execute the above-noted code/instruction sets and subroutines. Microprocessor 1300 may be coupled via a storage adaptor (not shown) to the above-noted storage device(s) (e.g., storage device 26). An I/O controller (e.g., I/O controller 1302) may be configured to couple microprocessor 1300 with various devices, such as keyboard 1304, pointing/selecting device (e.g., mouse 1306), custom device, such a microphone (e.g., device 1308), USB ports (not shown), and printer ports (not shown). A display adaptor (e.g., display adaptor 1310) may be configured to couple display 1312 (e.g., CRT or LCD monitor(s)) with microprocessor 1300, while network controller/adaptor 1314 (e.g., an Ethernet adaptor) may be configured to couple microprocessor 1300 to the above-noted network 18 (e.g., the Internet or a local area network).

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. An alert communication device comprising:
a first transceiver configured to communicatively couple the alert communication device with one or more other alert communication devices via a first communication path;
a second transceiver configured to communicatively couple the alert communication device with the one or more other alert communication devices via a second communication path;
a third transceiver configured to communicatively couple the alert communication device with one or more alert activation devices via a third communication path; and
one or more of:
a visual alert system, wherein the visual alert system includes a plurality of electronically-controlled lights configured to provide a plurality of visual alerts, and
an audio alert system
wherein the alert communication device is configured to:
receive an alert signal from a first alert activation device of the one or more alert activation devices; and
transmit the alert signal to the one or more other alert communication devices via the first communication path and wherein the alert communication device is configured to indicate at least a portion of an access path between a predefined first location and a location of the first alert activation device in response to receiving the alert signal from the first alert activation device, wherein the access path is depicted by the plurality of electronically-controlled lights.

2. The alert communication device of claim 1, further comprising:
a camera system.

3. The alert communication device of claim 1, wherein the alert communication device is configured to:
determine that the first communication path is inaccessible; and
transmit the alert signal to the one or more alert communication devices via the second communication path in response to determining that the first communication path is inaccessible.

4. The alert communication device of claim 1, wherein the alert communication device is configured to establish a communication channel between two or more client devices via one or more of the first communication path and the second communication path.

5. The alert communication device of claim 1, wherein the third transceiver is a Bluetooth® Low Energy transceiver configured to determine the location of the one or more alert activation devices relative to the alert communication device.

6. An alert activation device comprising:
a transceiver configured to communicatively couple the alert activation device to at least one alert communication device; and
two or more activation buttons communicatively coupled to the transceiver;
wherein the alert activation device is configured to transmit an alert signal via the transceiver in response to a user engaging at least one of the two or more alert activation buttons, wherein a type of alert signal transmitted by the transceiver is based upon, at least in part, a plurality of alert activation button press configurations, wherein the at least one alert communication device is configured to indicate at least a portion of an access path between a predefined first location and the location of the alert activation device when transmitting the alert signal using a visual alert system that includes a plurality of electronically-controlled lights configured to provide a plurality of visual alerts along the access path.

7. The alert activation device of claim 6, wherein the alert activation device is a wearable alert activation device.

8. The alert activation device of claim 7, wherein the alert activation device is configured to be affixed to an identification badge.

9. The alert activation device of claim 6, wherein the transceiver is configured to transmit a location of the alert activation device when transmitting the alert signal.

10. The alert activation device of claim 9, wherein the transceiver is a Bluetooth® Low Energy transceiver.

11. The alert activation device of claim 9, wherein the transceiver is configured to transmit a general alert signal when a first button of the two or more buttons is engaged and is configured to transmit a medical alert signal when a second button of the two or more buttons is engaged.

12. The alert activation device of claim 11, wherein the at least one alert communication device is configured to indicate at least a portion of an access path between a predefined first location and the location of the alert activation device when transmitting the medical alert signal.

13. A alert management system comprising:
one or more alert communication devices communicatively coupled to one or more other alert communication devices and configured to provide one or more of a visual alert and an audio alert; and one or more alert activation devices communicatively coupled to at least one alert communication device of the one or more alert communication devices;

wherein the alert management system is configured to:
receive, at the one or more alert communication devices, an alert signal from a first alert activation device of the one or more alert activation devices; and indicate, via the one or more alert communication devices, an access path between a predefined first location and a location of the first alert activation device in response to receiving the alert signal from the first alert activation device, wherein the one or more alert communication devices are configured to indicate at least a portion of the access path between a predefined first location and the location of the alert activation device when transmitting the alert signal using a visual alert system that includes a plurality of electronically-controlled lights configured to provide a plurality of visual alerts along the access path.

14. The alert management system of claim 13, further comprising:
one or more alert gateways,
wherein the one or more alert communication devices are communicatively coupled to the one or more alert gateways.

15. The alert management system of claim 13, wherein the one or more alert communication devices include a plurality of alert communication devices and are configured to communicatively couple the alert communication device with one or more other alert communication devices of the plurality of alert communication devices via a first communication path.

16. The alert management system of claim 15, wherein the one or more alert communication devices are configured to communicatively couple the alert communication device with the one or more other alert communication devices of the plurality of alert communication devices via a second communication path.

* * * * *